United States Patent [19]

Thum

[11] 3,839,969
[45] Oct. 8, 1974

[54] ELASTOMERICALLY MOUNTED AXLE BOXES

[75] Inventor: Helmut Thum, Vellmar, Germany

[73] Assignee: Wegmann & Co., Kassel, Germany

[22] Filed: Nov. 22, 1972

[21] Appl. No.: 308,907

[30] Foreign Application Priority Data
Nov. 25, 1971 Germany............................ 2158357

[52] U.S. Cl................ 105/224.1, 105/171, 105/222
[51] Int. Cl......... B61f 5/30, B61f 5/38, B61f 15/02
[58] Field of Search............ 105/218 R, 224, 224.1, 105/171, 222

[56] References Cited
UNITED STATES PATENTS

| 3,220,358 | 11/1965 | Peras | 105/224.1 |
| 3,380,400 | 4/1968 | Barber | 105/224.1 X |
| 3,638,582 | 2/1972 | Beebe | 105/224.1 X |

FOREIGN PATENTS OR APPLICATIONS

| 460,000 | 1/1937 | Great Britain | 105/224.1 |
| 253,849 | 7/1965 | Netherlands | 105/224.1 |

Primary Examiner—M. Henson Wood, Jr.
Assistant Examiner—Howard Beltran
Attorney, Agent, or Firm—Burgess, Dinklage & Sprung

[57] ABSTRACT

A wheel mounting on a torsionally weak truck for a rail vehicle which comprises a truck frame, an axle bearing housing, and a pair of frame support bearings, one disposed fore and the other disposed aft of the axle, each of said bearings comprising an upper plate, a lower plate, and a resilient layer disposed between said upper plate and said lower plate, each of said bearings affixed to said truck frame and said axle bearing housed by a pair of pins, the pin joining said bearing with said truck frame longitudinally offset from the pin joining said bearing with said axle bearing housing, each of said frame support bearings additionally joined to the axle bearing housing frame support bearings and said axle bearing housing which accommodate said threaded fastening means, the bores provided in said axle bearing housing having a larger diameter then the corresponding fastening means accommodated therein.

6 Claims, 6 Drawing Figures

ELASTOMERICALLY MOUNTED AXLE BOXES

BACKGROUND OF THE INVENTION

1. Field of the Invention

This invention is directed to a wheel mounting on a torsionally weak truck of the type employed on rail vehicles, a torsionally weak truck being one which, when it is subjected to the torsional stress as encountered in normal running conditions, results in that the wheel pressure differentials are at the most equal to, but are preferably lower than those produced in the case of torsionally hard or rigid trucks in which the truck frames abut on the wheel-and-axle assembly through conventional suspension springs. More particularly, this invention is directed to an assembly of a truck frame, a frame support bearing, and an axle bearing housing wherein the frame support bearing is attached to the truck frame and axle bearing housing by a pair of pins longitudinally offset from one another. This invention is further directed to a method of compensating for the construction tolerances in a wheel mounting of the type herein described, involving assembling the truck with two axle bearings disposed on a wheel-and-axle assembly, which bearings are pushed in a direction parallel to the axle until the free play of the wheel-axle assembly in the one axle bearing at the outside thereof and in the other axle bearing at the inside thereof is equal to zero. Thereafter, the truck frame is placed upon these frame support bearings and threaded fastening means are tightened to join the frame support bearings with an axle bearing housing.

2. DISCUSSION OF THE PRIOR ART

Wheel mounts are known in which one frame support bearing is disposed before and after each axle bearing housing in the longitudinal direction of the truck, the said frame support bearing having two plates joined to the truck frame and to the axle bearing housing by means of a guiding pin engaging a bore, and rubber-elastic pads being disposed between the said plates. In the wheel mounts of the prior art the guiding pins by which the frame support bearings are mounted on the truck frame and the axle bearing housing, respectively, are concentric with one another. Since construction tolerances are necessarily present between the distance of the socket bores provided in the right and left axle bearing housings on the wheel-and-axle assembly for the accommodation of the guiding pins of the frame support bearing and the distance of the socket bores provided in the truck frame for the accommodation of the guiding pins of the frame support bearing, special measures must be taken in order to compensate these construction tolerances. The simplest such measure consists in increasing the axial play within the axle bearings to such an extent that the construction tolerance can be taken up by the axial play. Designs of this kind are known. They have the disadvantage that, with increasing construction tolerance, one of the two axle bearings has to absorb a greater portion of the transverse force applied, depending on the direction of this transverse force. Also, depending on how great the axial play is made to be, it may happen that the axial play increase has to be provided for entirely by the construction tolerances.

In experiments with high-speed rail vehicles, it has been found that it is of great advantage to the stability of the running of the wheel-and-axle assemblies for a free axial play to be present in the axle bearings, because in this manner the mass of the truck is largely decoupled from the wheel-and-axle assembly. The wheel-and-axle assembly can then without hindrance perform the well-known undulating movement without inducing a undulating movement also in the truck frame, especially when an anti-swivel system is provided between the truck frame and the car body. It is well known that the riding properties of rail vehicles may be affected by the undulating movement of the trucks which are running in a horizontal substantial sinusoidal path, the truck periodically nosing from one side of the truck to the other within the clearance existing between the flanges of the wheels and the gauge of the truck.

The objectives on which the invention is based consisted in creating a wheel mounting in which the construction tolerances in the dimensions of the space between the bores in the axle bearing housing and the bores in the truck frame could be compensated without impairing the free axial play in the axle bearings. Furthermore, the assembly of the truck was to be able to be performed in a simple manner, without special procedures for measuring the position of the truck frame transversely of the wheel mountings.

SUMMARY OF THE INVENTION

The solutions of the above-mentioned problems attendant the prior art type rail mountings are solved by a wheel mounting on a torsionally weak truck comprising a truck frame, an axle bearing housing, and a pair of frame support bearings, one disposed fore and the other disposed aft of the axle, each of said bearings comprising an upper plate, a lower plate, and a resilient layer disposed between said upper plate and said lower plate, each of said bearings affixed to said truck frame and said axle bearing housing by a pair of pins, the pin joining said bearing with said truck frame longitudinally offset from the pin joining the said bearings with said axle bearing housing, each of said frame support bearings additionally joined to the axle bearing housing by a threaded fastening means.

In the wheel mounting of the present invention, there are provided bores in the frame support bearings and the axle bearing housing which accommodate the threaded fastening means which joins the axle bearing housing to the frame support bearings. In accordance with the invention, the bores in the axle bearing housing have larger diameter than the diameter of the threaded fastening means accommodated therein.

It will be seen from the description below that the difference between the diameter of the bores in the axle bearing housing accommodating the threaded fastening means and the diameter of the threaded fastening means itself is of the order of magnitude of the maximum construction tolerances occuring transversely of the truck between the distances of the bores for the pins joining the bearing with the axle bearing housing and the truck frame. A wheel mounting of the present invention is particularly characterized by the relative relationship of the pins joining the bearings with the truck frame and axle bearing housing. It has been stated above that these pins are longitudinally offset. By these terms is meant that the pins do not lie in the same vertical plane caused by vertically intersecting the wheel mounting parallel to the direction of the axle. Rather, they are positioned one ahead of the other. Suitably, the pins joining the bearing with the truck frame are positioned closer to the axle than are the pins joining the bearings with the axle bearing housing. This allows for the appropriate compensation of the mechanism when the truck frame is mounted beneath a rail car and the same is in motion upon a rail. Thus, with respect to a single axle for a wheel, there is a bearing fore and a bearing aft of a said axle and a pair of pins joining the bearing with the truck frame and a second pair joining the bearing with the axle bearing housing. These pins can be arranged so as to be disposed in mirror-image symmetry with respect to wheel axle. The bearings themselves can be positioned so as to be canted outwardly or inwardly. Thus, the bearings can be inclined such that the angle formed by the intersection of a first line drawn through the center of the bore for the pin joining the bearing with the truck frame and perpendicular to the axle and a second line drawn from said center through the center of the bore of the pin joining said axle bearing housing and said bearing is between −1° and +1°, all as more fully described below.

As will be explained in greater detail below, it is possible with the wheel mounting of the invention to compensate the above-mentioned construction tolerances in a simple manner, without impairing the free axial play in the axle bearing. If, for instance, the distances between the socket bores in the truck frame in the direction transversely of the truck are larger or lower than a standard-value this will be compensated by canting inwardly or outwardly the bearings to such a degree that the distances between the socket bores in the axle bearing housings in the direction transversely of the truck will be correct. Because of the larger diameter of the bores in the axle bearing housings accommodating the threaded fastening means it will be possible to fasten the axle bearing housings at the bearings in spite of the angle position of the latter. By this compensation of the construction tolerances it is brought about that, as already stated, all four frame support bearings in each wheel-and-axle assembly absorb the transverse forces between the truck frame and the wheel assembly in approximately the same proportion. This is of considerable advantage in determining the dimensions of the components.

It has proven to be advantageous if, in the frame support bearings disposed at each end of an axle bearing housing, the bores or guiding pins, as the case may be, are in a mirror-image symmetry with the wheel axle. In one especially advantageous embodiment, the bores associated with the axle bearing housings are offset outwardly, with reference to the axle, from the bores associated with the truck frame.

Since the wheel mounting of the invention is intended primarily for high-speed rail vehicles having trucks designed for hypercritical car operation, it has proven expedient, in the wheel mounting of the invention, for the plates of the frame support bearings to have two bearing surfaces each, converging roof-wise symmetrically with a vertical plane, in accordance with an older proposal, with the ridge lines extending horizontally and substantially lengthwise of the truck. Through this construction of the bearing surfaces it is brought about that the springing will be softer in the lengthwise direction of the vehicle than it will be in the transverse direction. In this manner, an expecially stable operation of the wheel-and-axle assemblies is achieved.

BRIEF DESCRIPTION OF THE DRAWINGS

The characteristics of the wheel mounting of the invention will now be further explained with the aid of an embodiment represented in the appended drawings, in which.

DESCRIPTION OF SPECIFIC EMBODIMENT

Figure 1:
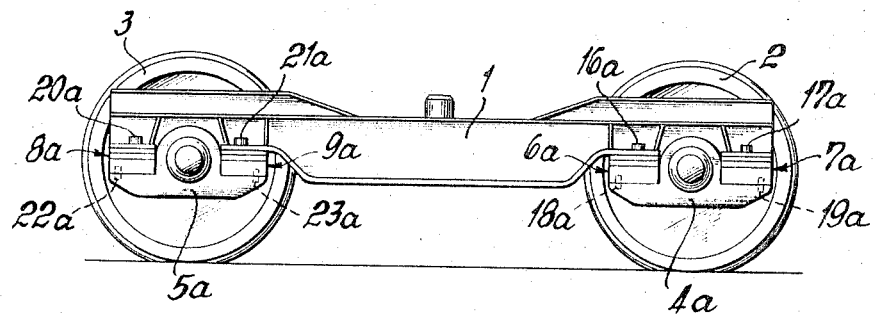
FIG. 1 is a simplified side elevational view of a truck with the wheel mounting system of the invention.
Figure 2:
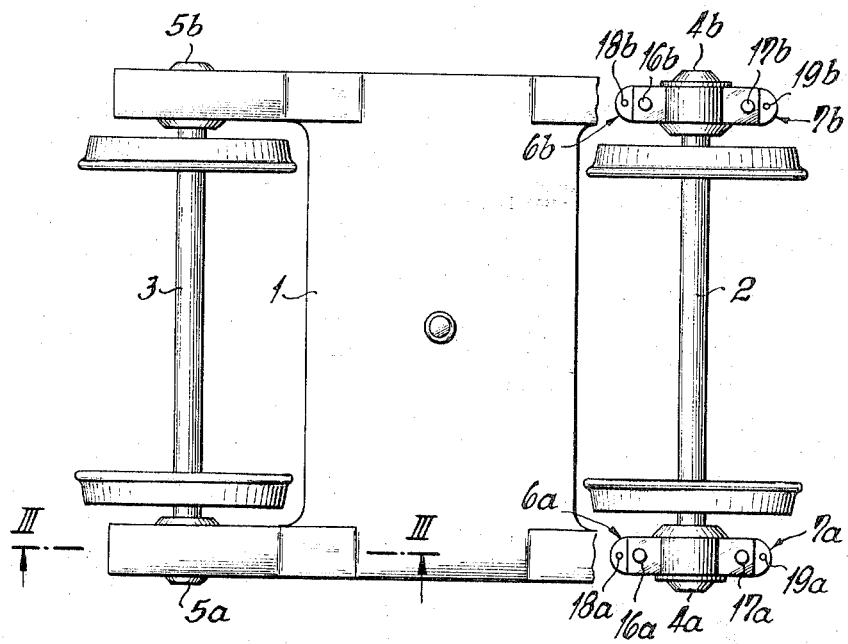
FIG. 2 is a plan view of the truck of FIG. 1, with the truck frame partially cut away.

Referring to the drawings, in which like numerals represent like parts, the truck represented in FIGS. 1 to 4 has a truck frame 1 on which the wheel-and-axle assemblies 2 and 3 are disposed. The axle bearings 45a, 45b for wheel-and-axle assembly 2 are disposed in the axle bearing housings 4a and 4b, and the axle bearings for wheel-and-axle assembly 3 are disposed in axle bearing housings 5a and 5b. The truck frame 1 is supported through frame support bearings 6a, 6b, 7a, 7b, 8a, 8b and 9a, 9b on the axle bearing housings 4a, 4b and 5a, 5b. As indicated in FIGS. 1 and 2, the frame support bearings are mounted through guiding pins 16a, 16b, 17a, 17b, 20a and 21a to the truck frame 1, and through guiding pins 18a, 18b, 19a, 19b, 22a and 23a to the axle bearing housings. The guiding pins 18a, 18b and 19a, 19b are offset from the guiding pins 16a, 16b, and 17a, 17b outwardly, away from the wheel axle 2, in the longitudinal direction of the truck. In like manner, guiding pins 22a and 23a are offset from the guiding pins 20a and 21a outwardly, away from the wheel axle 3, in the longitudinal direction of the truck.

Figure 3:
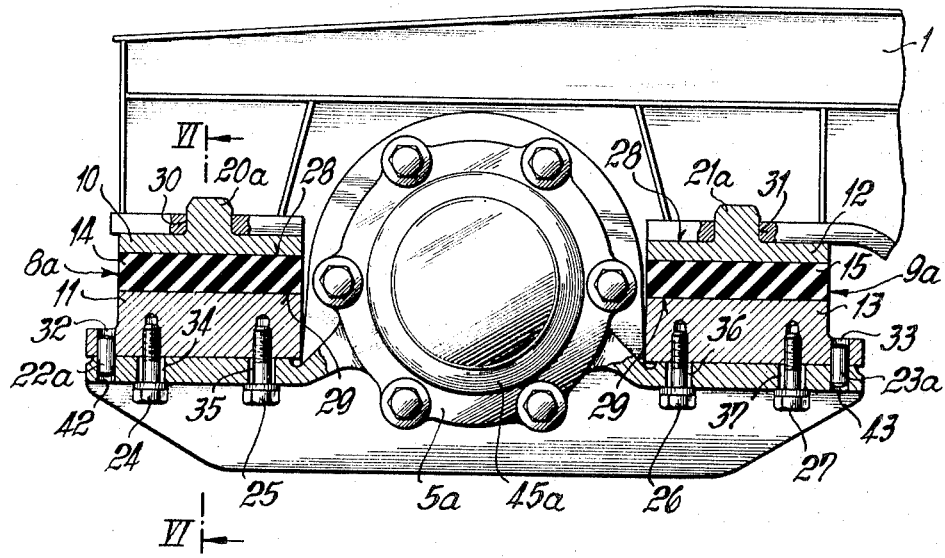
FIG. 3 is a cross section along line III—III in FIG. 2.
Figure 4:
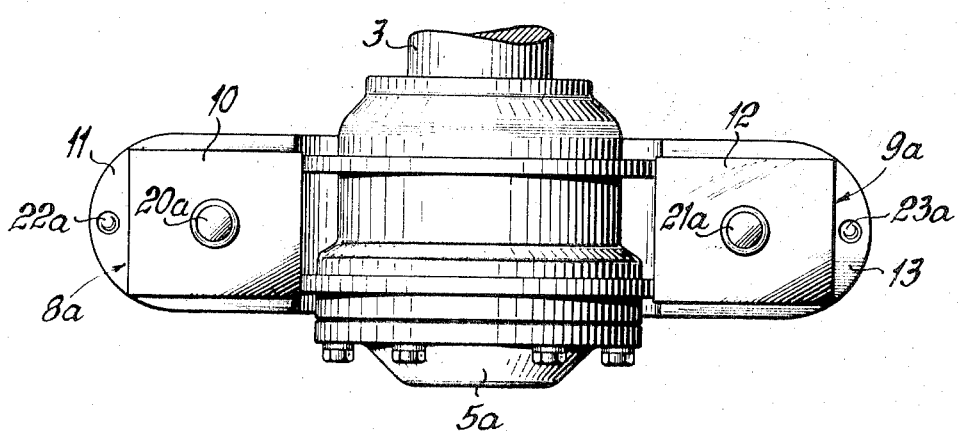
FIG. 4 is a partial top view of FIG. 3.
Figure 6:
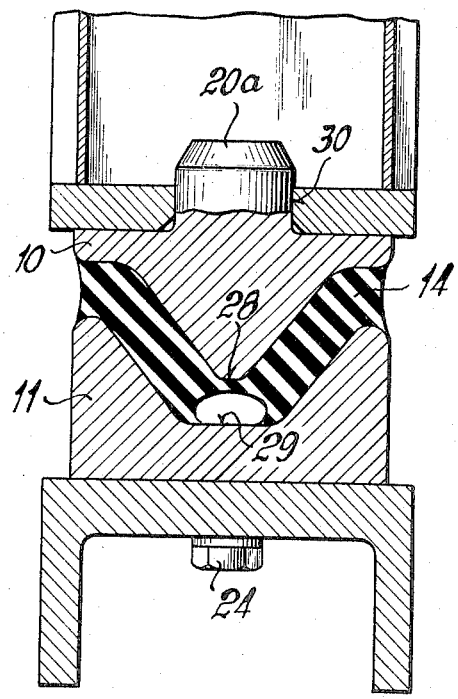
FIG. 6 is a cross section along line VI—VI in FIG. 3 on a larger scale.

In FIGS. 3 and 4 one of the four wheel-and-axle mountings of the truck represented in FIGS. 1 and 2 is shown on a larger scale for clarification. It may be seen from FIGS. 3 and 4 that the frame support bearing 8a has an upper plate 10 and a lower plate 11. The upper plate 10 has a guiding pin 20a which is integral with plate 10 and carried in a bore 30 in the truck frame 1. Plate 11 is joined to the axle bearing housing 5a through a guiding pin 22a which is held in a bore 32 of plate 11 and in a bore 42 of the axle bearing housing 5a. Between the plates 10 and 11 there is provided a rubber-elastic pad 14. Frame support bearing 9a has in like manner an upper plate 12 whose guiding pin 21a is integral with plate 12 and is held in a bore 31 in truck frame 1, while the lower plate 13 is mounted on the axle bearing housing 5a through a guiding pin 23a held in bores 33 and 43. As indicated in FIG. 6 plates 10, 11, 12 and 13 are each provided with two bearing surfaces converging in the manner of a roof whose ridge lines 28 and 29 run horizontally and substantially in the longitudinal direction of the truck.

The two lower plates 11 and 13 are joined by means of bolts 24 and 25, and 26 and 27, respectively, to the axle bearing housing 5a. The bolt passage holes, 34 and 35, and 36 and 37, respectively, which are provided on the axle bearing housing for this purpose have a greater diameter than the bolts associated with them. As it will be explained more precisely hereinbelow, it is desirable to make the difference in diameter such that no more than the maximum possible construction tolerances in the distance between the bores in the truck frame, on the one hand, and those in the axle beaing housings on the other, will be able to be compensated.

The manner of operation of the wheel mounting will now be explained with the aid of FIG. 5, along with a method for compensating construction tolerances in a wheel mounting in accordance with FIGS. 1 to 4 and FIG. 6.

Figure 5:
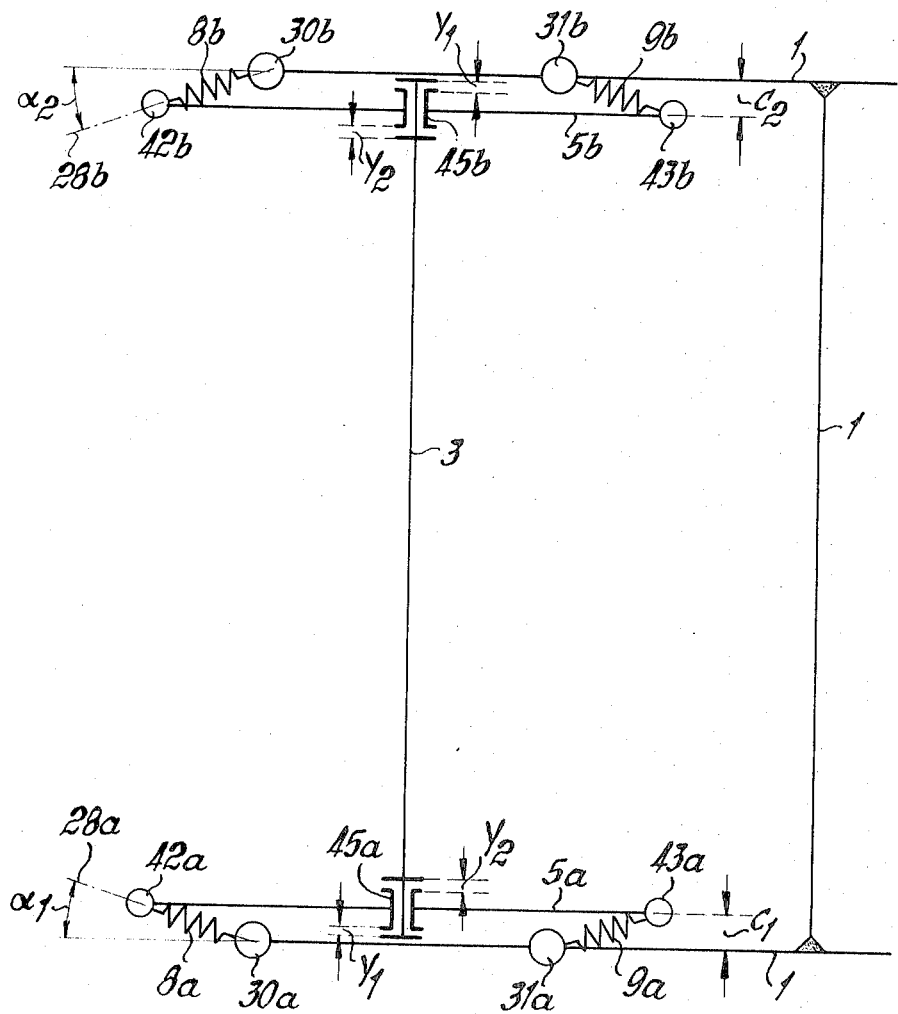
FIG. 5 is a highly schematized representation of one half of the truck of FIGS. 1 and 2.

FIG. 5 shows a highly schematized representation of one half of the truck of FIG. 1. Only those parts which are essential to the operation of the system are indicated. On the truck frame 1 are located the bores 30a, 30b, and 31a, 31b; the bores 42a and 43a are located on the axle bearing housing 5a, and the bores 42b and 43b are located on axle bearing housing 5b. Bores 30a, 30b and 31a, 31b are, as already shown in FIG. 3, located centrally on the resilient support bearings 8a, 8b and 9a, 9b, respectively, indicated in FIG. 5. Bores 42a, 42b and 43a, 43b are offset outwardly from the wheel axle 3 in the manner already shown. In FIG. 5, $c_1$ and $c_2$ indicate one half of the construction tolerance between the truck frames and the axle bearing housings. In addition, $y_1$ and $y_2$ indicate the free axial play in the axial bearings. FIG. 5 shows the final state in which the truck with the wheel mount of the invention is to be after assembly. Magnitudes $y_1$ and $y_2$ are to be equal on both sides of the wheel-and-axle assembly. The construction tolerances $c_1$ and $c_2$ are compensated by the fact that the ridge line 28a of the frame support bearings 8a and 9a forms the angle $\alpha_1$ with the longitudinal direction, and the ridge line 28b of the frame support bearings 8b and 9b forms the angle $\alpha_2$ with the longitudinal direction of the truck. In practical cases $c_1$ and $c_2$ are between 0.05000 inch (1.27mm) and +0.05000 inch (1.27mm). The maximum values of $y_1$ and $y_2$ are about 0.19685 inch (5 mm). As a result thereof the angles $\alpha_1$ and $\alpha_2$ are between $-1°$ and $+1°$. To permit this angular adjustment of the frame support bearings, the bolt admission holes provided in the axle bearing housings 5a and 5b are given a greater diameter than the corresponding bolts, as already explained in connection with FIG. 3. It is desirable that the oversize of the diameter of the bolt passage holes be neither too large nor too small. If the hole size is insufficient it may happen under certain circumstances that not all of the construction tolerances will be compensated, and in the case of a hole diameter greater than is necessary, the truck frame might be misaligned transversely of the wheel-and-axle assemblies after assembly. The bore diameter is therefore made to be just sufficiently oversize in relation to the diameter of the bolts that the maximum construction tolerances can be compensated. In this case, any expensive procedure for measuring the position of the truck frame transverly of the wheel-and-axle assemblies can be dispensed with.

Compensation of the construction tolerances can be performed, in the wheel mounting system described, by a simple method. It is especially desirable, in this case, for the truck to have a device by which the swiveling of the truck underneath the car body is greatly impeded, at least in straight runs. Such trucks with anti-swiveling systems are known or have already been described in earlier proposals.

Upon the assembly of the truck, the two axle bearings 45a, 45b disposed on a wheel-and-axle assembly are displaced in the same direction parallel to the wheel axis until the free play of the wheel-and-axle assembly in the axial direction in the one axle bearing on the outside thereof ($y_1$) and in the other axle bearing on the inside thereof ($y_2$) is equal to zero. The frame support bearings 8a, 8b, 9a, 9b will then be mounted on the axle bearing housings 5a and 5b only by the pins in the bores 42a, 42b and 43a, 43b, respectively, without being additionally fastened by the bolts described with reference to FIG. 3. In this state of assembly, the truck frame 1 is placed upon the frame support bearings 8a, 8b, 9a, 9b in such manner that the pins of the frame support bearings are located in bores 30a, 30b, and 31a, 31b, respectively. During this procedure the bearings 8a, 8b, 9a, 9b will be turned outwardly (or inwardly) to such a degree that the above mentioned angles $\alpha_1$ and $\alpha_2$ will occur. Then the frame support bearings are tightly bolted to the axle bearing housings by means of the bolts. After this procedure the truck is ready to run. When running on a straight track with a truck thus adjusted, an approximately equal axial play with $y_1 = y_2$ will establish itself on both sides of the wheel-and-axle assembly, the latter overcoming the above-mentioned anti-swivel effect and, on the basis of its undulating movement, bringing the wheel-and-axle assembly into a central position. During travel this axial free play does not remain always the same. However, after a disturbance it is always corrected automatically by the wheel-and-axle assembly itself.

The elastic constants of the frame support bearings are only slightly modified by the angles $\alpha_1$ and $\alpha_2$ of the offset, because when the maximum construction tolerances that occur are compensated, these angles are smaller than $\mp 1°$. When using the method of compensating the construction tolerances described above it will be unnecessary to know the exact values of $c_1$ and $c_2$.

I claim:

1. A wheel mounting on a truck comprising a truck frame, an axle bearing housing and a pair of frame support bearings, one disposed fore and the other disposed aft of the axle, each of said bearings comprising an upper plate, a lower plate, and a resilient layer disposed between said upper plate and said lower plate, each of said bearings affixed to said truck frame and said axle bearing housing by a pair of pins, the pins joining said bearing with said truck frame longitudinally offset from the pin joining said bearing with said axle bearing housing, each of said frame support bearings additionally joined to the axle bearing housing by a threaded fastening means, and bores provided in said frame support bearings and said axle bearing housing which accommodate said threaded fastening means, the bores provided in said axle bearing housing having a larger diameter than the corresponding fastening means accommodated therein.

2. A wheel mounting according to claim 1, wherein in the frame support bearings disposed on both ends of an axle bearing housing the pins are disposed in mirror-image symmetry with respect to the wheel axle.

3. A wheel mounting according to claim 1 wherein the pins joining the bearing with the axle bearing housing are positioned more remote from the axle than are the pins joining the bearing with the truck frame.

4. A wheel mounting according to claim 3, wherein the threaded fastening means has heads, the diameter of the bores in said axle bearing housing accomodating said threaded fastening means is smaller than the threaded fastening means heads, and the threaded fastening means does not engage said axle bearing housing.

5. A wheel mounting according to claim 1 wherein the upper and lower plates of a frame support bearing have two bearing surfaces inclined towards one another said bearing surfaces being disposed symmetrically to a vertical plane, the ridge lines of said bearing surfaces extending horizontally and substantially in the longitudinal direction of the truck.

6. A wheel mounting according to claim 1 wherein the upper and lower plates are inclined such that the angle formed by the intersection of a first line drawn through the center of the bore for the pin joining the bearing with the truck frame and perpendicular to the axle and a second line drawn from said center through the center of the center of the bore for the pin joining said axle bearing housing and said bearing is between $+1°$ and $-1°$.

* * * * *

UNITED STATES PATENT OFFICE
CERTIFICATE OF CORRECTION

Patent No. __3,839,969__ Dated __October 8, 1974__

Inventor(X) __Helmut Thum__

It is certified that error appears in the above-identified patent and that said Letters Patent are hereby corrected as shown below:

In the Abstract, 6th line from bottom

After "housing" and before "frame" insert
-- by a threaded fastening means, and bores provided in said --.

Column 5, line 6

"beaing" should be "bearing"

Signed and sealed this 11th day of March 1975.

(SEAL)
Attest:

RUTH C. MASON
Attesting Officer

C. MARSHALL DANN
Commissioner of Patents
and Trademarks